(12) United States Patent
Azzam (10) Patent No.: US 10,568,459 B2
(45) Date of Patent: Feb. 25, 2020

(54) COOKING APPARATUS

(71) Applicant: Shaker Azzam, Wetherill Park (AU)

(72) Inventor: Shaker Azzam, Wetherill Park (AU)

( * ) Notice: Subject to any disclaimer, the term of this patent is extended or adjusted under 35 U.S.C. 154(b) by 859 days.

(21) Appl. No.: 14/605,846

(22) Filed: Jan. 26, 2015

(65) Prior Publication Data

US 2015/0208861 A1 Jul. 30, 2015

(30) Foreign Application Priority Data

Jan. 30, 2014 (AU) ................................ 2014200512

(51) Int. Cl.
*A47J 37/06* (2006.01)
*A47J 37/04* (2006.01)
*A47J 37/07* (2006.01)

(52) U.S. Cl.
CPC ............ *A47J 37/041* (2013.01); *A47J 37/04* (2013.01); *A47J 37/043* (2013.01); *A47J 37/049* (2013.01); *A47J 37/0647* (2013.01); *A47J 37/0688* (2013.01); *A47J 37/0731* (2013.01); *A47J 37/0745* (2013.01); *A47J 37/0786* (2013.01)

(58) Field of Classification Search
CPC .. A47J 37/042; A47J 37/0623; A47J 37/0629; A47J 37/0664; A47J 27/04; A47J 2027/043; A21B 3/04
USPC ......... 99/341, 393, 395, 403, 400, 427, 446, 99/450; 219/400, 492, 521, 678, 685, 219/700, 703; 126/273.5, 275 E, 39 C, 126/39 E, 5, 92 AC, 92 C
See application file for complete search history.

(56) References Cited

U.S. PATENT DOCUMENTS

| 277,754 A | * | 5/1883 | Lucas | F23H 13/00 126/152 R |
|---|---|---|---|---|
| 1,400,558 A | * | 12/1921 | McClure | F24C 1/04 126/36 |
| 2,718,845 A | * | 9/1955 | Dudley | A47J 37/0731 126/25 A |
| 3,190,211 A | * | 6/1965 | Ticoian | A47J 37/041 99/421 P |
| 4,089,258 A | * | 5/1978 | Berger | A47J 37/0688 126/39 J |
| 4,120,237 A | * | 10/1978 | Mecherlen | A47J 37/0731 126/25 R |
| 4,468,932 A | * | 9/1984 | Bullard | F25D 3/08 62/421 |

(Continued)

FOREIGN PATENT DOCUMENTS

KR 1020130023689 * 3/2013 ............. A47J 27/04

*Primary Examiner* — Tu B Hoang
*Assistant Examiner* — Masahiko Muranami
(74) *Attorney, Agent, or Firm* — Craft Chu PLLC; Andrew W. Chu (57) ABSTRACT

A cooking apparatus 20 comprises a body 22 having a base wall 24, side walls 26, a rear wall 28, a top wall 30 and a shelf 34. The shelf 34, top panel 35, and sections of the side walls 26 and rear wall 28 therebetween define a cooking space 40 having an open front 42. The cooking apparatus 20 further comprises a heating means 46 which extends along an internal surface of the rear wall 28 facing the cooking space 40. In the embodiment, the heating means 46 comprises gas ceramic burners 46 for directing and distributing heat towards the cooking space 40 in a substantially uniform manner. A moisture infusion assembly 50 is arranged above the shelf 34 and thus at a lower portion of the cooking space 40.

18 Claims, 11 Drawing Sheets (56) References Cited

U.S. PATENT DOCUMENTS

| | | | | |
|---|---|---|---|---|
| 4,884,499 | A  * | 12/1989 | Rensch | A47J 37/0688 99/449 |
| 6,119,584 | A  * | 9/2000 | Hsu | A47J 37/042 219/400 |
| 6,837,149 | B1 * | 1/2005 | Tsontakis | A47J 37/046 99/339 |
| 2004/0065313 | A1 * | 4/2004 | Thompson | A47B 77/02 126/37 R |
| 2004/0144260 | A1 * | 7/2004 | Backus | A47J 37/041 99/419 |
| 2005/0051038 | A1 * | 3/2005 | Bartelick | A23B 4/044 99/482 |
| 2006/0043087 | A1 * | 3/2006 | Gagas | F24C 15/18 219/391 |
| 2011/0283893 | A1 * | 11/2011 | Bennett | A47J 37/044 99/421 H |
| 2013/0000629 | A1 * | 1/2013 | Christopoulos | A47J 37/041 126/25 AA |
| 2014/0251159 | A1 * | 9/2014 | Yang | A47J 27/04 99/341 |

* cited by examiner

COOKING APPARATUS

RELATED U.S. APPLICATIONS

Not applicable.

STATEMENT REGARDING FEDERALLY SPONSORED RESEARCH OR DEVELOPMENT

Not applicable.

REFERENCE TO MICROFICHE APPENDIX

Not applicable.

BACKGROUND OF THE INVENTION

1. Field of the Invention

The present invention relates to a cooking apparatus, in particular a barbeque apparatus. The apparatus is however not limited to this use.

2. Description of Related Art Including Information Disclosed Under 37 CFR 1.97 and 37 CFR 1.98.

The present invention seeks to overcome or substantially ameliorate at least some of the deficiencies of the prior art, or to at least provide an alternative.

It is to be understood that, if any prior art information is referred to herein, such reference does not constitute an admission that the information forms part of the common general knowledge in the art, in Australia or any other country.

SUMMARY OF THE INVENTION

According to a first aspect, the present invention provides a portable cooking apparatus comprising:

a cooking space defined by a lower shelf, a top panel and side walls, the cooking space having an open front;

a heating means for providing heat in a generally lateral direction to the cooking space;

a food holding means for holding food in the cooking space, the food holding means comprising spaced slots formed in the side walls; and a moisture infusion assembly extending across and covering a lower portion of the cooking space in use.

In one embodiment, the heating means extends in a generally upright configuration.

In another embodiment, the cooking apparatus comprises a rear wall, wherein the heating means is disposed along the rear wall.

In one embodiment, the cooking apparatus comprises a top wall having a second heating means thereon.

In one embodiment, the heating means comprises at least one of a gas ceramic burner, a gas burner and an electric heating element.

In one embodiment, the cooking apparatus comprises a fuel chamber for receiving portable fuel for the heating means.

In one embodiment, the moisture infusion assembly extends between the side walls.

In one embodiment, the moisture infusion assembly is disposed along and covers the lower shelf.

In another embodiment, the moisture infusion assembly comprises a tray having a variable opening gate configurable between fully closed and fully opened positions, and partially opened positions therebetween.

In another embodiment, the variable opening gate comprises upper and lower panels, each panel comprising elongated openings separated by bars therebetween.

In another embodiment, the upper panel is fixed in position and the lower panel can be slid in a lateral direction relative to the upper panel.

In another embodiment, the food holding means comprises a vertical skewer.

In another embodiment, the food holding means comprises horizontal cooking racks.

In another embodiment, the food holding means comprises a grill holder having a mounting post.

In another embodiment, the cooking apparatus comprises a turning means for turning the food holding means.

In another embodiment, the heating means comprises a heat beads holder.

In another embodiment, the heat beads holder comprises a heat beads tray and a mesh extending across and covering an upper opening of the heat beads tray.

In another embodiment, the heat beads tray comprises spaced shelves for holding the heat beads.

In another embodiment, the shelves comprise a panel angled downwardly towards the mesh.

In another embodiment, the shelves comprise a distal portion disposed adjacent the mesh.

In another embodiment, the heat beads holder is configurable between a horizontal loading position and an upright in use position.

In another embodiment, the cooking apparatus comprises a mounting slot formation formed therein for allowing the heat beads holder to be configured between the horizontal loading position and an upright in use position.

Other aspects of the invention are also disclosed.

BRIEF DESCRIPTION OF THE DRAWINGS

Notwithstanding any other forms which may fall within the scope of the present invention, preferred embodiments of the present invention will now be described, by way of examples only, with reference to the accompanying drawings.

DETAILED DESCRIPTION OF THE DRAWINGS

It should be noted in the following description that like or the same reference numerals in different embodiments denote the same or similar features.

FIGS. 1 to 5 show a cooking apparatus 20 in accordance with a first preferred embodiment of the present invention. The cooking apparatus 20 comprises a generally rectangular prism shaped body or cooking body 22 having a base wall 24, side walls 26, a rear wall 28 and a top wall 30. Each side wall has a front edge 203 and a back edge 201. The body 22 further includes a lower front wall 32 which extends upwardly from the base wall 24 for only about a fifth of the height of the rear wall 28 at respective front edges of the side walls, and an upper front wall 33 which extends downwardly from the top wall 30 only by a short distance at respective front edges of the side walls.

A lower shelf 34 extends from an upper edge of the lower front wall 32 towards the rear wall 28 or towards respective back edges of the side walls, and a top panel 35 extends from a lower edge of the upper front wall 33 towards the rear wall 28 or towards respective back edges of the side walls. The lower shelf 34, top panel 35, and sections of the side walls 26 and rear wall 28 therebetween define a cooking space 40 having an open front 42.

The cooking apparatus 20 further comprises a heating means 46 which extends along an internal surface of the rear wall 28 facing the cooking space 40. In the embodiment, the heating means 46 comprises gas ceramic burners 46 for directing and distributing heat towards the cooking space 40 in a substantially uniform manner.

A moisture infusion assembly 50 is arranged above the shelf 34 and thus at a lower portion of the cooking space 40. Components of the moisture infusion assembly 50 will be further described below.

Figure 8:
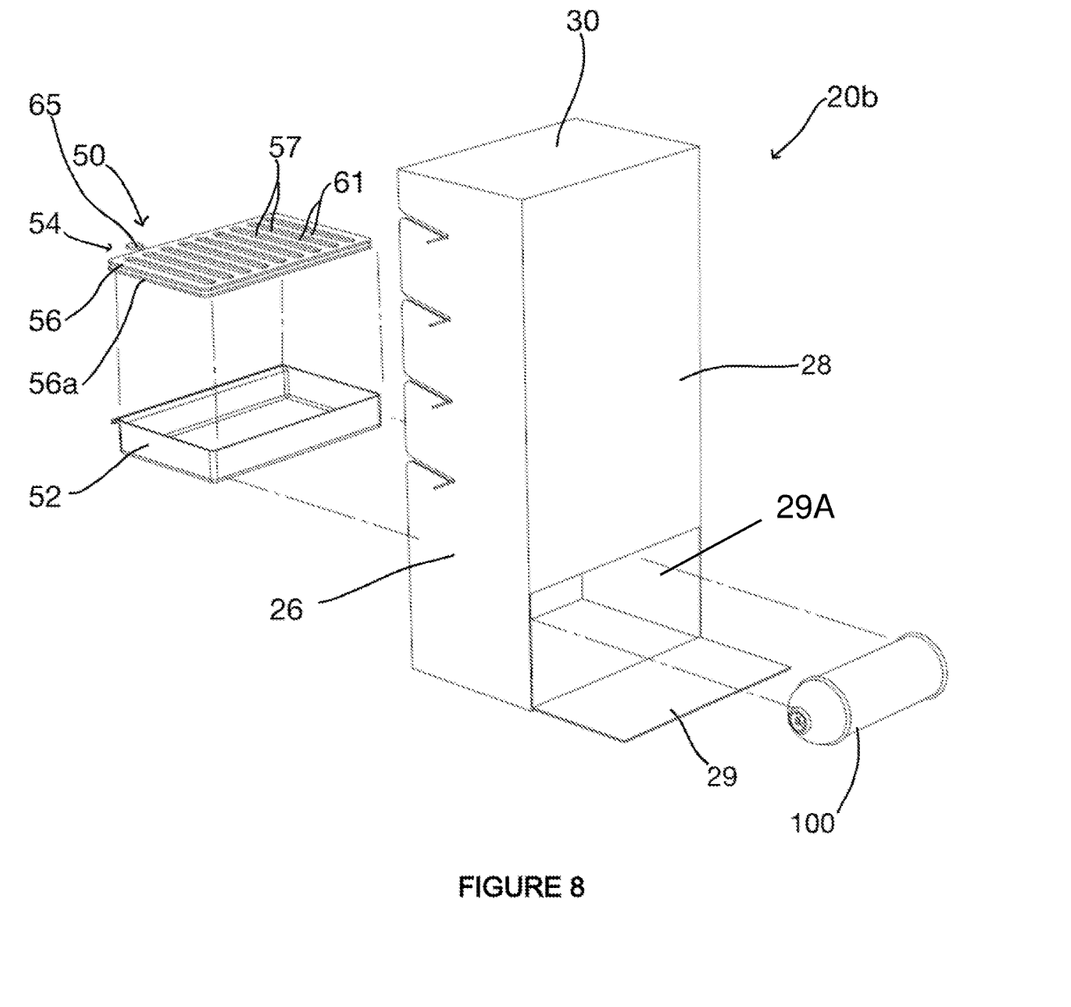
FIG. 8 is a rear perspective partially exploded view of the cooking apparatus of FIG. 7.

The cooking apparatus 20 in the embodiment is portable and fueled by a portable fuel canister 100 as shown in FIG. 8 which is inserted via a fuel chamber 29A with a loading door 29 of the rear wall 28 into the cooking apparatus 20. The loading door 29 corresponds in size and position to the lower front wall 32.

The fuel in the gas canister 100 can be butane, propane, a combination thereof or any other suitable fuel. The lower front wall 32 comprises a gas cartridge valve engagement lever 62, an ignition button 64 and a gas control knob 66. The lever 62 is used in use to lock the valve of the canister 100 in place. When gas is allowed to flow via the knob 66 to the burners 46, the ignition button 64 is actuated to ignite the fuel gas in the burners 46.

A gas burner (stove) 70 is also disposed in the top wall 30, with an associated ignition button 74 and a gas control knob 76 at the upper front wall 33. The gas burner 70 also receives fuel from the gas canister 100 in use.

Figure 1:
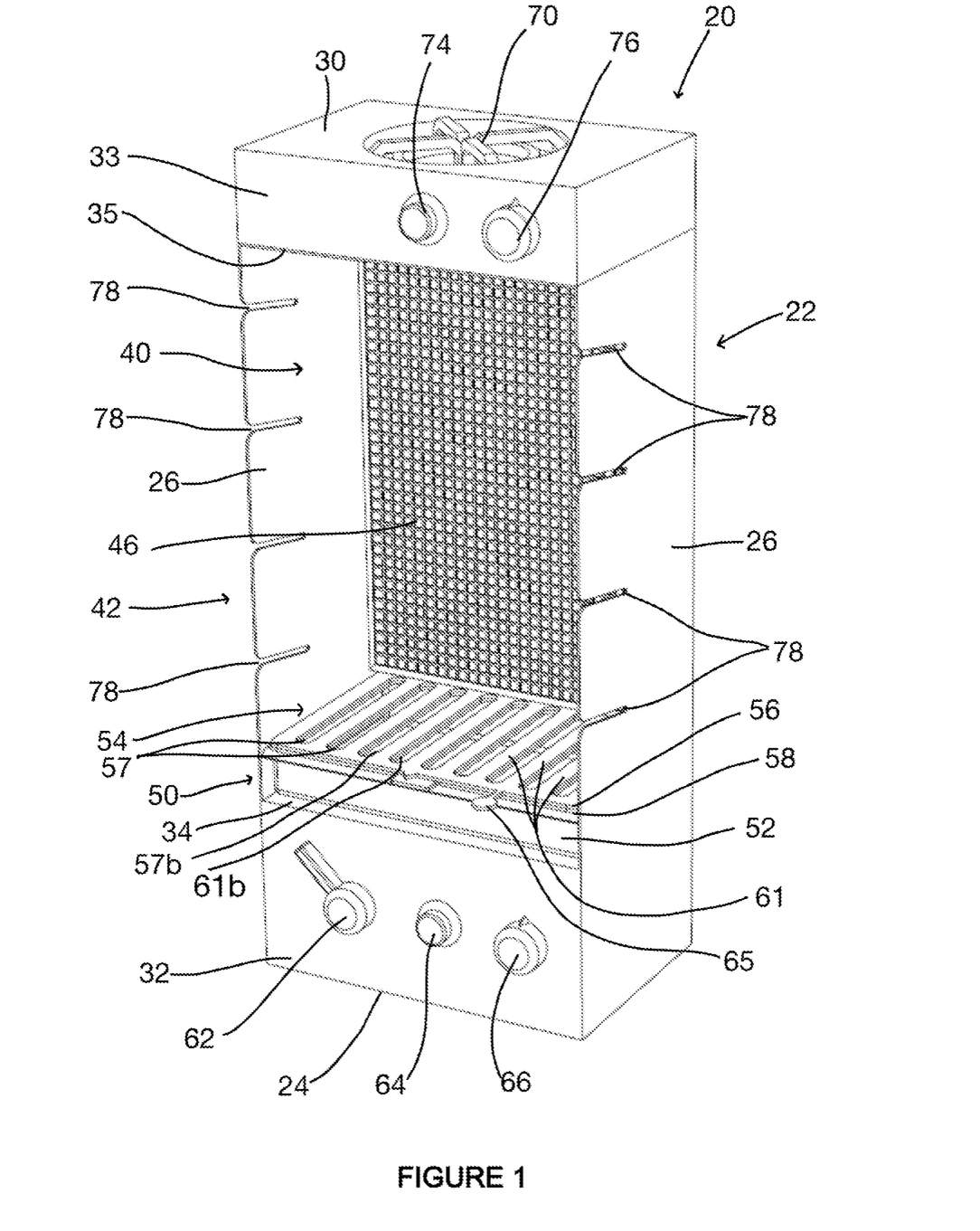
FIG. 1 is a front perspective view of a cooking apparatus in accordance with a first preferred embodiment of the present invention.
Figure 2:
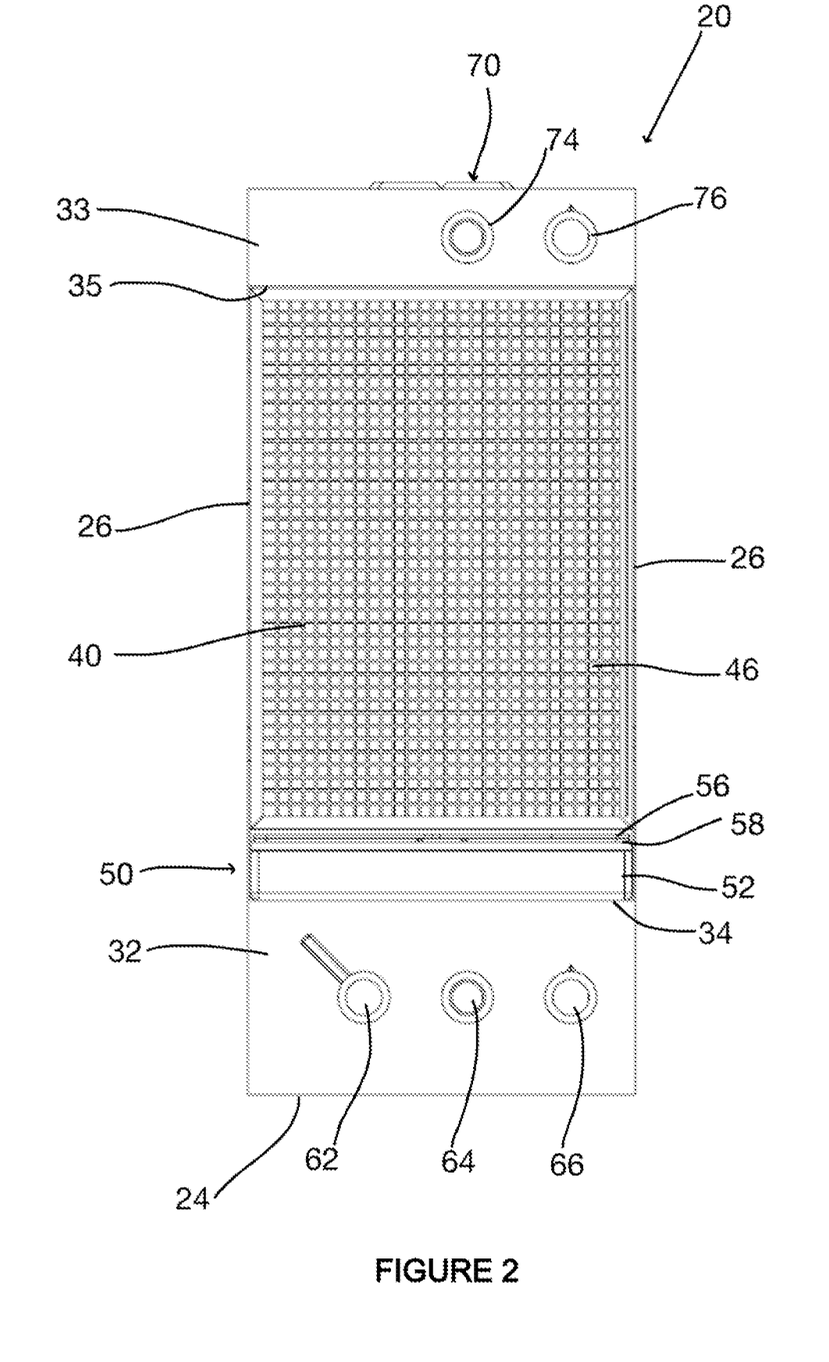
FIG. 2 is a front elevation view of the cooking apparatus of FIG. 1.
Figure 3:
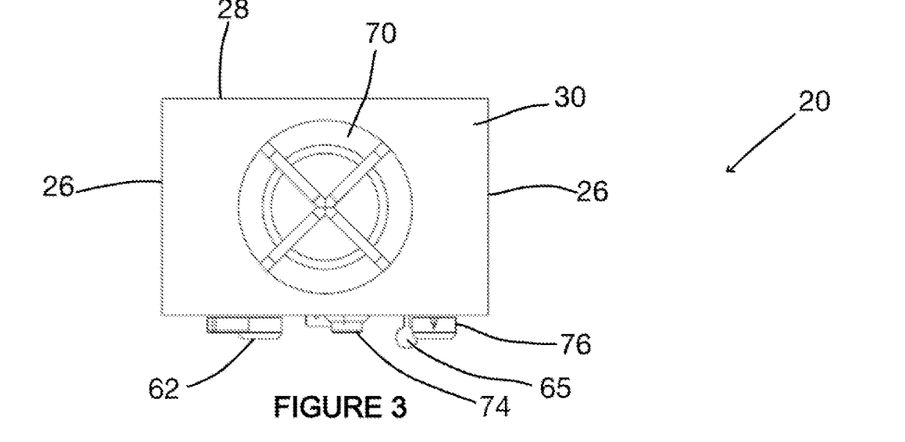
FIG. 3 is a top plan view of the cooking apparatus of FIG. 1
Figures 4, 5:
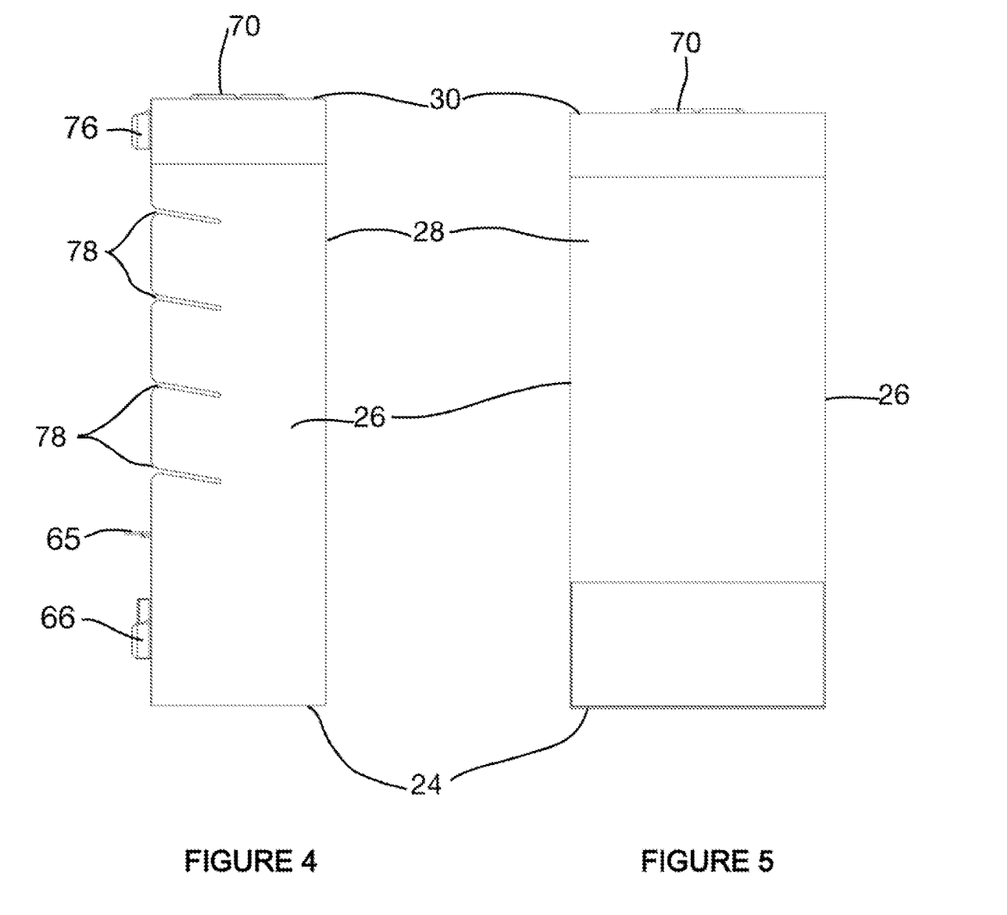
FIG. 4 is a side elevation view of the cooking apparatus of FIG. 1.
FIG. 5 is a rear elevation view of the cooking apparatus of FIG. 1.
Figure 6:
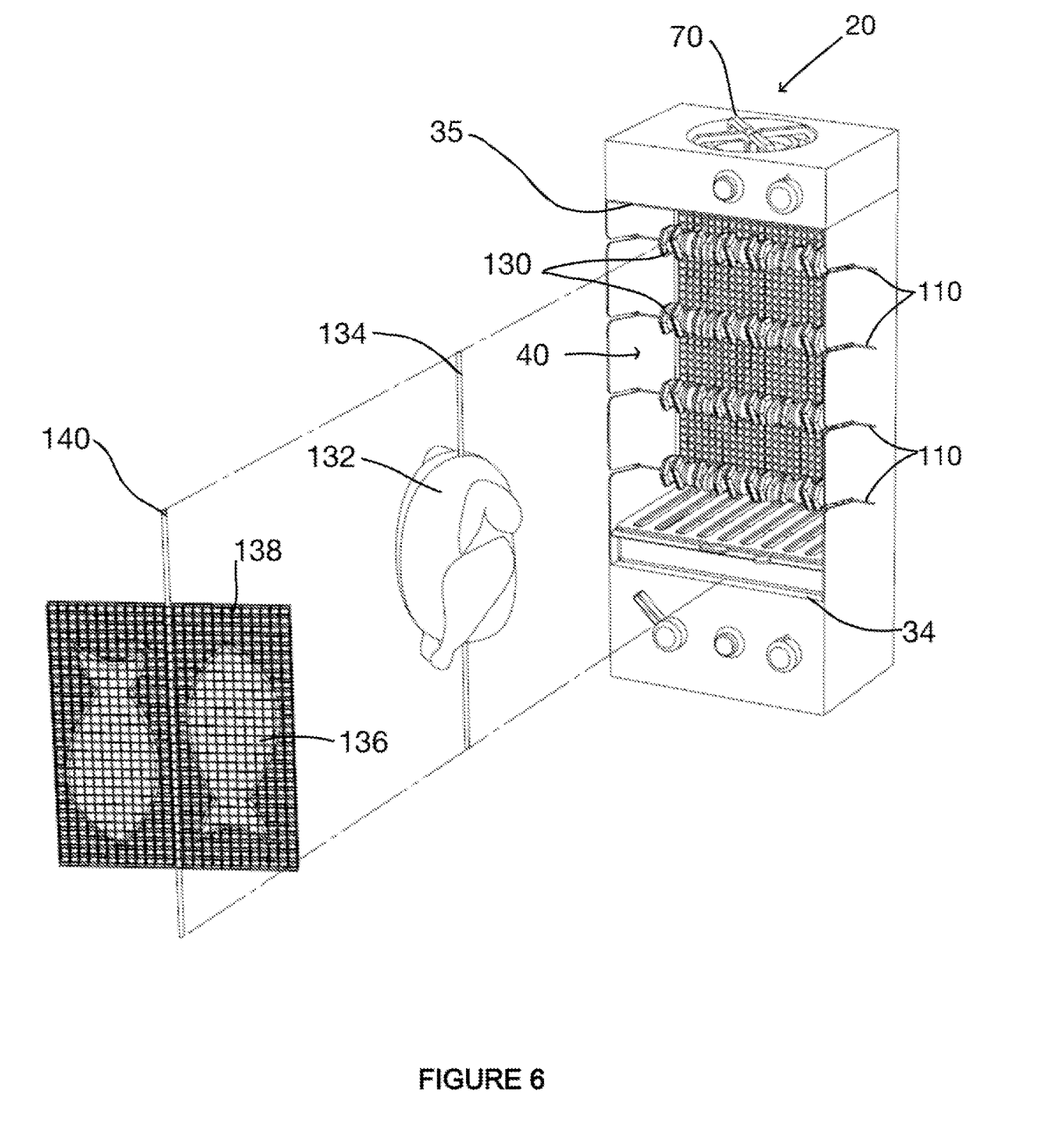
FIG. 6 is a front perspective view of the cooking apparatus of FIG. 1 in use.

Vertically spaced slots 78 are formed in portions of the side walls 26, the slots 78 extending from a front edge thereof and directed generally towards the rear wall 28 at a slight downward angle. The slots 78 terminate about halfway along the side walls 26. The slots 78 are arranged in aligned pairs between portions 26A of the side walls 26 corresponding to the cooking space. The portions are the food holder or food holding means. As shown in FIG. 6, the slots 78 in each pair are dimensioned to receive respective end portions of a skewer 110.

The moisture infusion assembly 50 (see also FIG. 8) comprises a tray 52 having a variable opening gate 54 extending across its top portion. The tray 52 extends over a lower portion of the cooking space, such as the lower shelf 34 within the cooking space 40. The variable opening gate 54 comprises openings 57 which can be configured between fully closed and fully opened positions, and partially opened positions therebetween.

The variable opening gate 54 comprises two similarly shaped upper and lower panels 56 and 56a. The upper panel 56 comprises elongated parallel upper openings 57 separated by upper bars 61 therebetween. Similarly, the lower panel 58 comprises elongated parallel lower openings 57b separated by lower bars 61b therebetween. The upper panel 56 is fixed in position whilst the lower panel 58 can be slid in a sideways direction relative to the upper panel 56 via a tab 65.

When the upper and lower openings 57 and 57b are aligned, the variable opening gate 54 is at its fully open position. When the lower panel 58 is moved such that the lower bars 61b are aligned with the upper openings 57, the variable opening gate 54 is at its fully closed position as the lower bars 61b block the upper openings 57. The lower panel 58 can then be moved sideways which varies how much of the lower bars 61b block the upper openings 57. This varies the effective size of the openings 57 which allows moisture within the tray 52 to escape in use. An indicator pointer showing "0-Max" is provided to indicate the fully closed and fully opened positions.

In use, the fuel canister 100 is loaded into the cooking apparatus 20 via the loading door 29 and the valve engagement lever 62. Fuel is then allowed to flow via the knob 66 to the burners 46, and the ignition button 64 is actuated to ignite the fuel in the burners 46 thus providing heat to the cooking space 40.

Referring to FIG. 6, food 130 is disposed in the skewers 110 and respective end portions of the skewers 110 are placed in the slots 78 as the food holding means. Skewers 110 with food 130 are thus parallel spaced within the cooking space 40 and the food can be cooked using the heat in the cooking space 40. The user can turn the skewers 110 as need to provide even cooking. In an alternative embodiment, turning means such as a battery or mains powered motor can be provided for turning the skewers automatically.

One the of the advantages of the cooking apparatus 20 is that the heating means 46 is oriented in a vertical orientation with the food to be cooked arranged in a generally vertical orientation adjacent the heating means 46. This means there is less grease falling onto the heating means 46 and thus less cleaning required. The vertical orientation of the cooking apparatus 20 also provides a smaller footprint compared to a typical horizontally orientated barbeque cooking apparatus as well as the ability to carry the portable cooking apparatus 20 easier.

To ensure that the food 130 being cooked does not dry, desired liquids are placed in the tray 52 which will be heated and evaporate in use, thus moisturizing the food 130. The liquid can be any one or a combination of water, cooking oil, spices, flavorings and sauces. The user can then select the rate at which the liquids reach the food 130 via the variable opening gate 54.

Referring to FIG. 6, bulky food 132, such as whole chickens, can also be cooked within the cooking space 40 via a vertical skewer 134 as another food holding means. The vertical skewer 134 is received in mounting portions of the shelf 34 and the top panel 35 to extend therebetween.

Generally planar shaped food 136, such as fish and steaks, can be cooked in a grill holder 138 which comprises two grill plates which can receive the food 136 therebetween, and a post 140 having a similar shape as the vertical skewer 134 as still another food holding means. The post 140 can then be received in a similar manner as the vertical skewer 134 in the mounting portions of the shelf 34 and the top panel 35.

Both the vertical skewer 134 and the grill holder 138 can then be turned manually by the user or the cooking apparatus 20 can include turning means (such as a battery or mains powered motor) for turning the vertical skewer 134 and the grill holder 138.

The user can further cook additional food via the gas burner 70 as needed.

Figure 7:
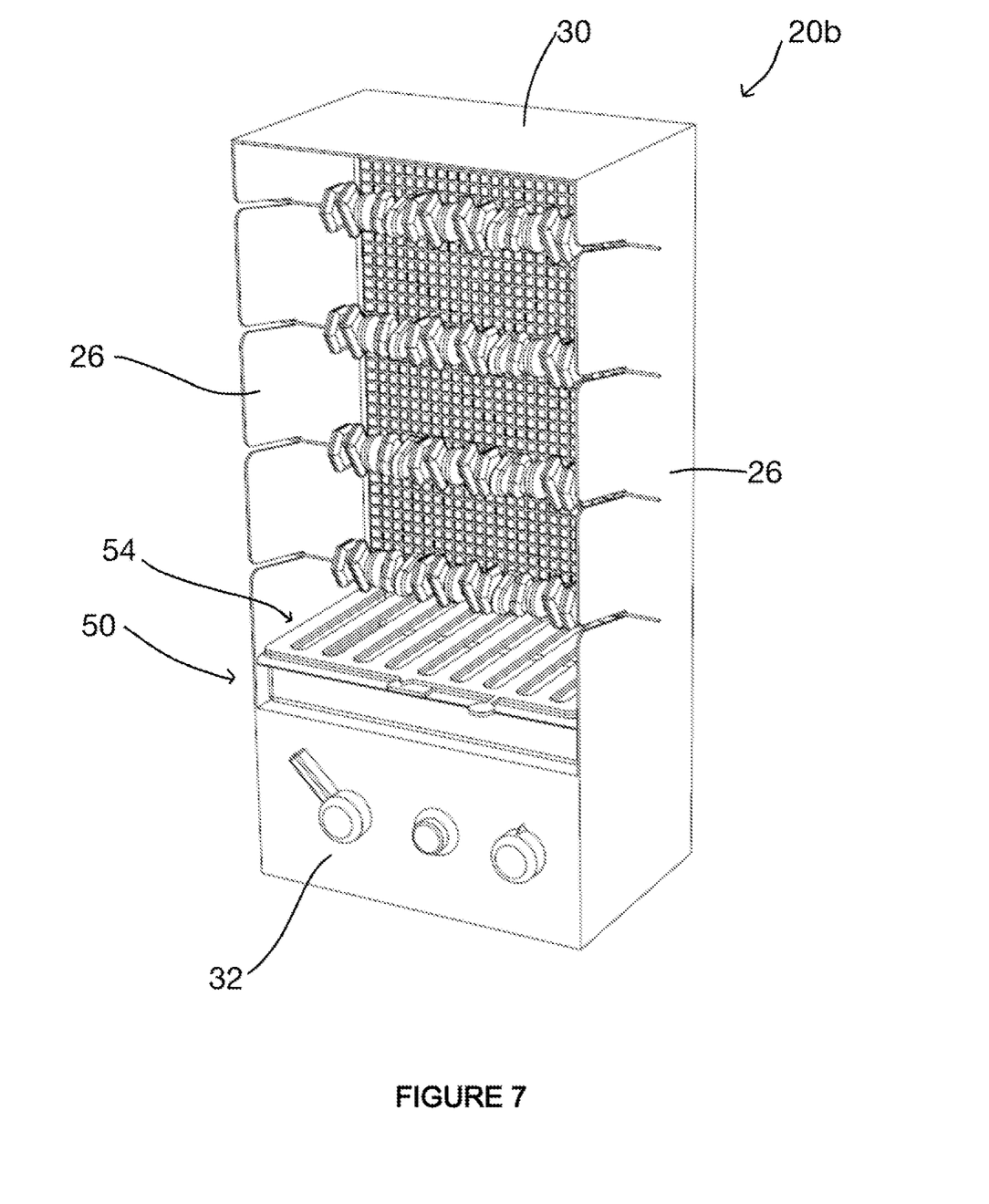
FIG. 7 is a front perspective view of a cooking apparatus in accordance with a second preferred embodiment of the present invention.

FIGS. 7 and 8 show a cooking apparatus 20b in accordance with a second preferred embodiment. The cooking apparatus 20b is similar to the cooking apparatus 20 above except that the cooking apparatus 20b does not have the gas burner 70 in the top wall 30, its associated ignition button 74 and gas control knob 76, and the upper front wall 33. The cooking space 40 in the cooking apparatus 20b can thus be larger.

Figure 9:
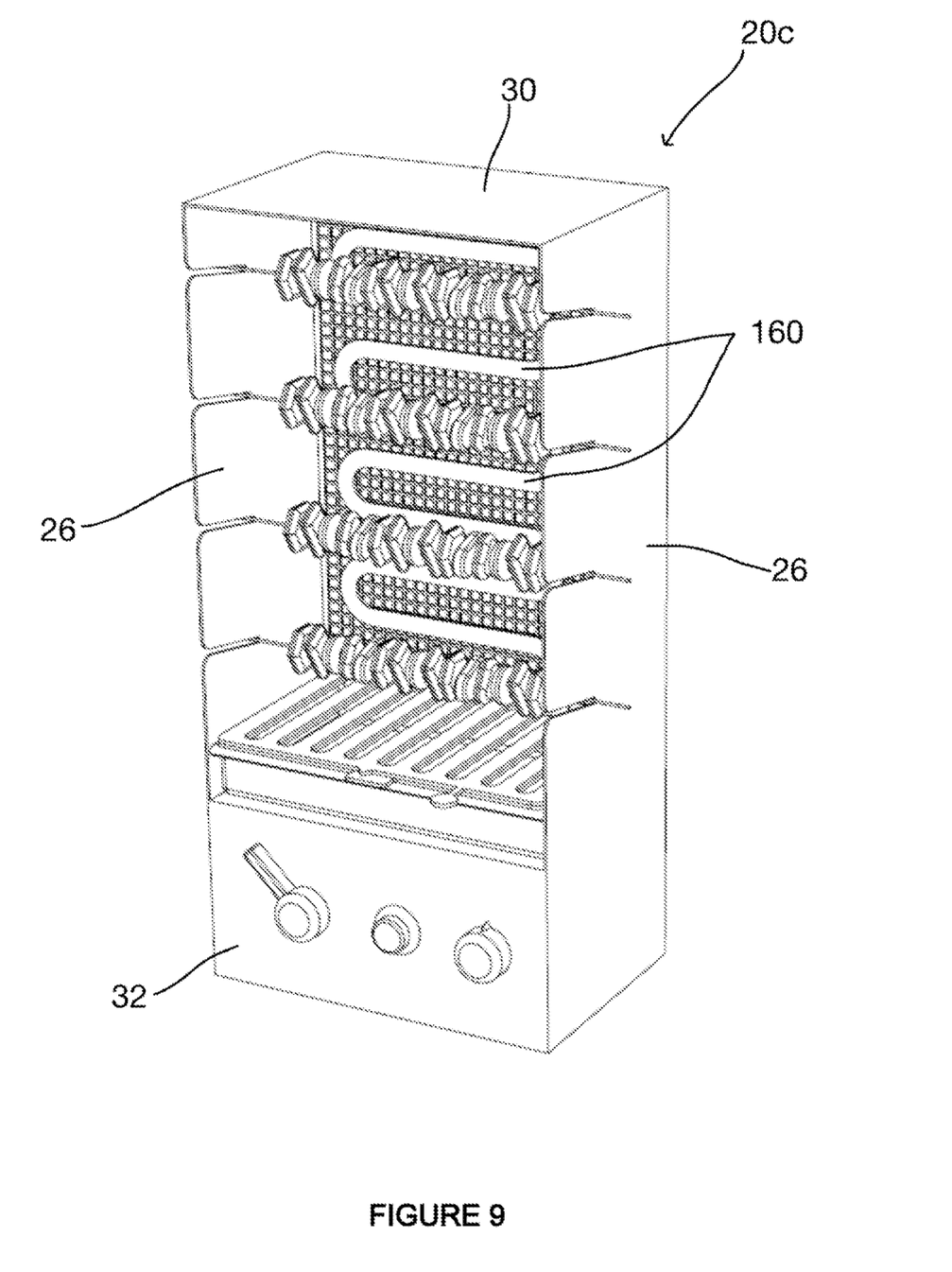
FIG. 9 is a front perspective view of a cooking apparatus in accordance with a third preferred embodiment of the present invention.

FIG. 9 shows a cooking apparatus 20c in accordance with a third preferred embodiment. The cooking apparatus 20c is similar to the cooking apparatus 20b above except that the cooking apparatus 20c additionally comprises a heating element 160 as part of the heating means 46. The heating element 160 is electric and can be an alternative to the gas ceramic burners 46 or additional thereto.

Figure 10:
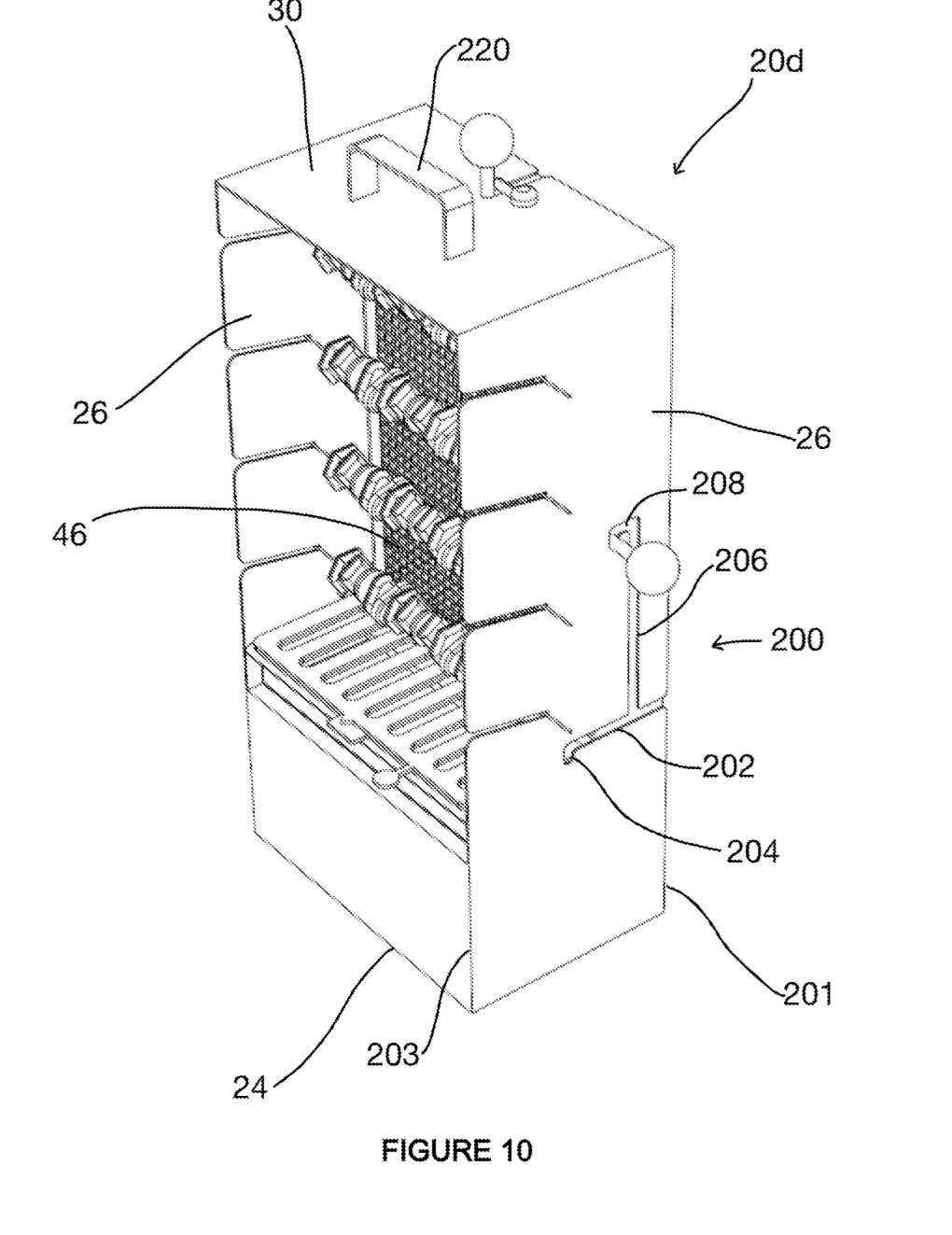
FIG. 10 is a front perspective view of a cooking apparatus in accordance with a fourth preferred embodiment of the present invention.
Figure 11:
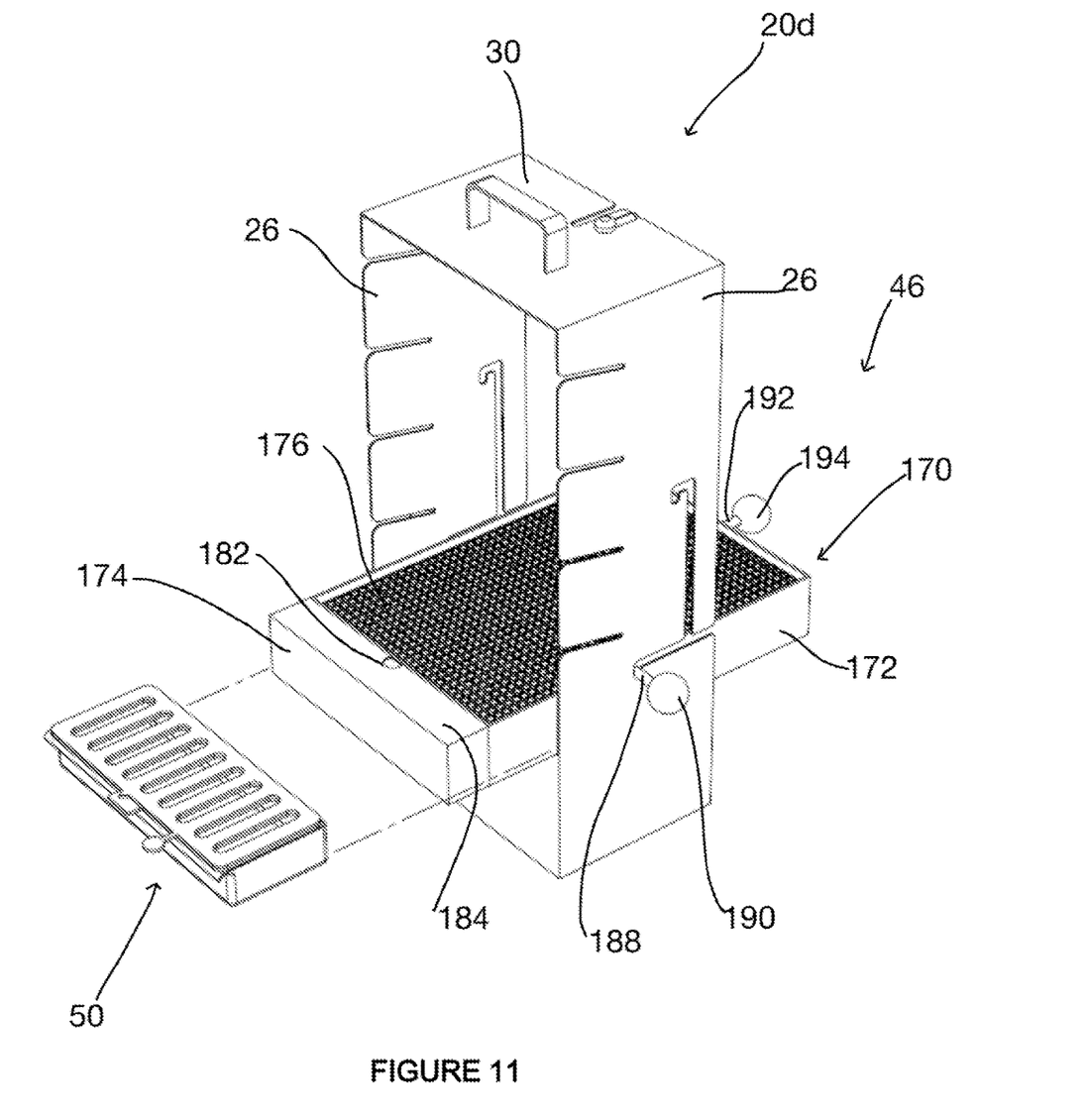
FIG. 11 is a front perspective view of the cooking apparatus of FIG. 10 in a loading position.
Figure 12:
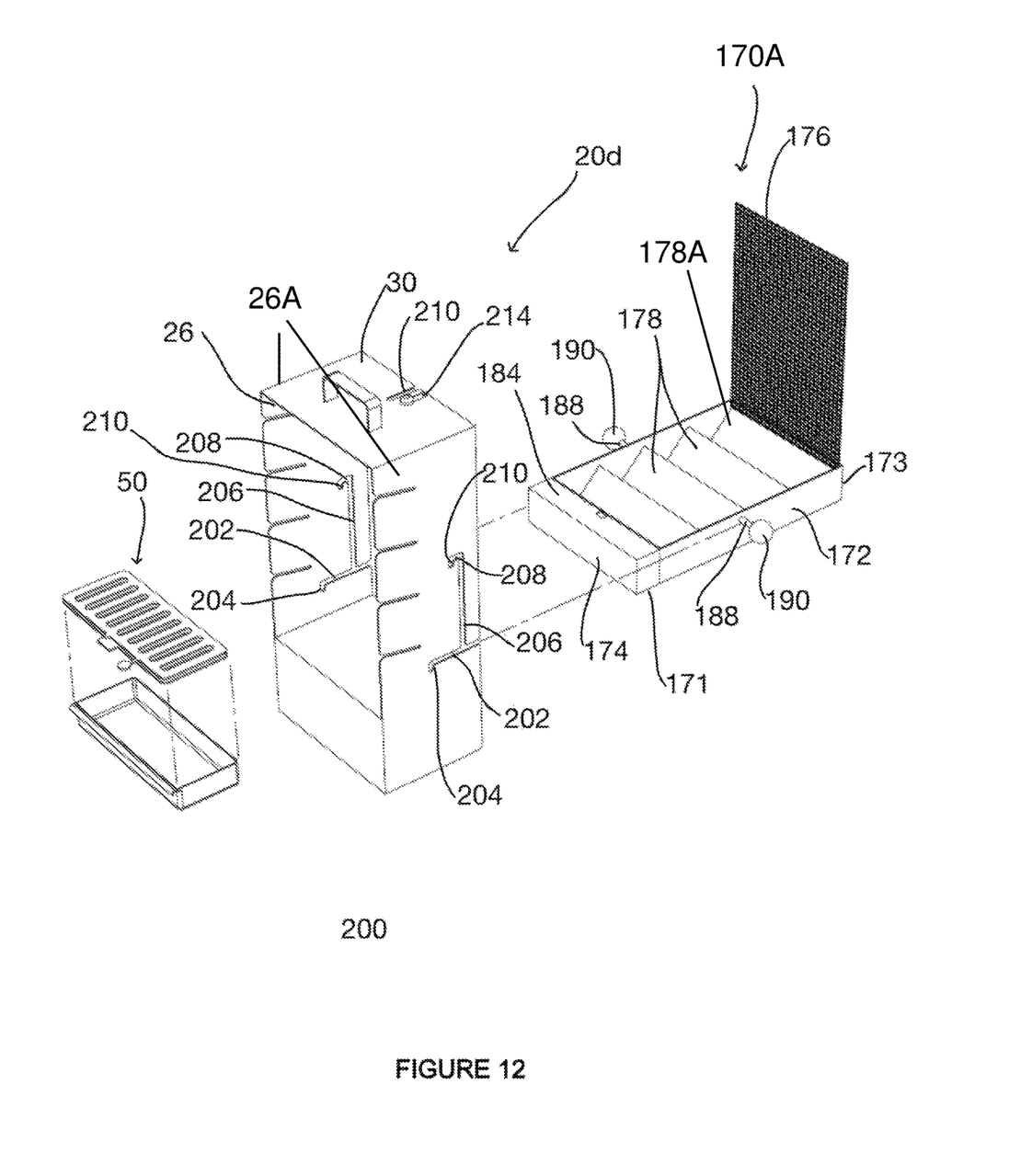
FIG. 12 is a front perspective exploded view of the cooking apparatus of FIG. 11.

FIGS. 10 to 12 shows a cooking apparatus 20d in accordance with a fourth preferred embodiment. The cooking apparatus 20d is similar to the cooking apparatus 20b above except that the cooking apparatus 20d has a different heating means 46.

The body 22 of the cooking apparatus 20d comprises a base wall 24, side walls 26, and a top wall 30. The body 22 does not include a rear wall 28.

The heating means 46 in this embodiment comprises a rectangular heat beads or briquette holder 170A which is dimensioned to replace the rear wall 28. The heat beads holder 46 includes a heat beads or briquette tray 170 having a base panel 171, side tray walls 172, an upper end wall 173 and a lower end wall 174. A metal mesh 176 is hingedly attached to the upper end wall 173 and is movable between an open position (FIG. 12) and a closed position (FIGS. 10 and 11) at which it extends across and covers an upper opening of the heat beads tray 170.

The heat beads tray or briquette tray 170 further comprises spaced shelves 178 which extend between the side walls 172. In the embodiment, the shelves 178 comprise a bent metal section which provides two angled panels 178A with the base panel 171. The shelves thus generally form two sides of a triangle having a peak distal to the base panel 171. The shelves 178 are spaced about 50 mm from each other and form receiving spaces with the base panel 171. The heat beads or briquettes are placed in the receiving spaces. When the metal mesh 176 is closed, the mesh 176 is adjacent the peak of the shelves 178. The shelves 178 with the mesh 176 thus retain the heat beads thereon when the heat beads holder 46 is oriented in a generally upright position, where the base panel 171 is generally upright (FIG. 10). The shelves 178 comprise an upper panel 178A downwardly angled towards the mesh, which allows the heat beads to be pushed towards the mesh. The heat beads thus generally stack against the mesh to provide generally evenly distributed heating. The heat beads tray 170 thus provides no cavities for easy cleaning as needed.

The metal mesh 176 can be locked in the closed position via a latch 182 mounted adjacent the lower end wall 174. In the upright orientation, the metal mesh 176 retains the heat beads in the shelves 178. The heat beads tray 170 further comprises an ash collection trough portion 184 formed adjacent the lower end wall 174.

For mounting and handling, the heat beads tray 170 comprises side posts 188 with end ball handles 190 respectively extending from the side walls 172, and a top post 192 with end ball handle 194 extending from the upper end wall 173. The use of these posts 188, 192 is described below.

The side walls 26 comprise a receiving and mounting slot formation 200 formed therein. The slot formation 200 comprises a first slot section 202 extending from a rear edge 201 of the side walls 26 and generally horizontally towards a front edge 203 thereof. The first slot section 202 extends to half of the width of the side walls 172 and includes a downwardly extending end seat 204.

The slot formation 200 further comprises a second slot section 206 extending vertically from the first section 202, close to the rear edge 201. A third slot section 208 extends horizontally forwardly from an upper end of the second slot section 206, the third slot section 208 having a downwardly extending end seat 210.

The top wall 30 comprises a locking slot 212 extending from the rear edge 201 and a movable locking bar 214. The top wall 30 also includes a carry handle 220.

As shown in FIG. 12, the heat beads holder 46 is fully removable from the body 22 of the cooking apparatus 20d. The metal mesh 176 is moved to the open position for placing heat beads within the tray 170. The heat beads can then be lighted.

The metal mesh 176 is moved to the closed position, and the posts 188 are inserted into the first slot section 202. As shown in FIG. 11, the posts 188 can also be placed in the seats 204 for loading heat beads in the tray 170.

As shown in FIG. 10, the posts 188 are then moved along the second slot section 206, and then the third slot section 208, to be seated in the end seats 210. The top post 192 is inserted into the locking slot 212 and the locking bar 214 is used to lock the top post 192. This orients the briquette holder 170A into the cooking position, as the upright position within the cooking space between the lower shelf and the top panel from the horizontal loading position, at which heat is directed towards the cooking space 40. The cooking apparatus 20 can then be used in a similar manner as above.

The present embodiments thus provide gas and/or electric portable and domestic upright vertical barbeque apparatus. Any juices from the food being cooked falls into the tray of the moisture infusion assembly. The cooking apparatus is configured for minimal scrubbing and cleaning free (providing a self-clean operation), compact and portable, can be used with electric, refillable gas tanks or disposable cartridge, provides uniform distribution of heat, and can cook food in skewers, a rotisseries function for whole chickens or shoulder roasting function.

The controlled moisture infusion system employed not only keeps the food tender and juicy with a coveted golden brown finish, it also prevents the formation of acrylamide, a harmful compound that can cause cancer. This compound is found in the blackened crust of grilled or roasted meat.

The configured tower shape allows the employment of a ceramic gas burner which in turn provides up to 30% energy cost saving and up to 80% reduction in CO and NOx gases.

The inherent flameless and wind resistant characteristics will also provide a safe home/outdoor operation topping up the main feature of uniformly distributed heat for even cooking results.

Unlike conventional cooking apparatus, the configured shape prevents the grease from dripping on the burning parts of the apparatus which normally ends up toughened and hard to remove, grease gets trapped instead in the moisture tray and hence substantially low cleaning and maintenance required. The burner does not get corroded and hence provides a long lifetime maintaining maximum working efficiency, Combining and applying simultaneously moist-heat cooking with dry-heat cooking in one cooking apparatus means reaping all advantages of both cooking methods and overcoming the disadvantage of each one separately. In other words the cooking apparatus of the present embodiments achieve the optimum cooking results between one extreme of moist-heat cooking and other extreme of dry-heat cooking attaining the taste, original food flavor, juiciness, tenderness and importantly the healthy cooking factor such as nutrition values retaining and acrylamide-free cooking. Conventional cooking apparatus compromises some of the above. The cooking apparatus of the present embodiments is an upright tower configuration moisture infusion barbeque (powered by gas, electric or charcoal) which can be for home or outdoor use; in other words for domestic or portable mobile.

Whilst preferred embodiments of the present invention have been described, it will be apparent to skilled persons that modifications can be made to the embodiments described. For example, the gas cartridge can be a bigger cylinder or the cooking apparatus can work on natural gas, mains AC electric power or dual powered of gas and electric;

For the electric version, the top burner can be an electric hotplate. Other possible features include rotating skewers and accessories, and fumes/smell exhaust fan can be added. The moisture infusion assembly can alternatively or additionally comprise a side pump with a mist valve that can infuse moisture to the cooking space.

The apparatus can also be used as a personal heater. The apparatus can also be provided with additional features such as a safety trip over feature, an auto gas cut off system, and an oxygen depletion sensor. The burner is preferably an infrared ceramic burner.

Figure 13:
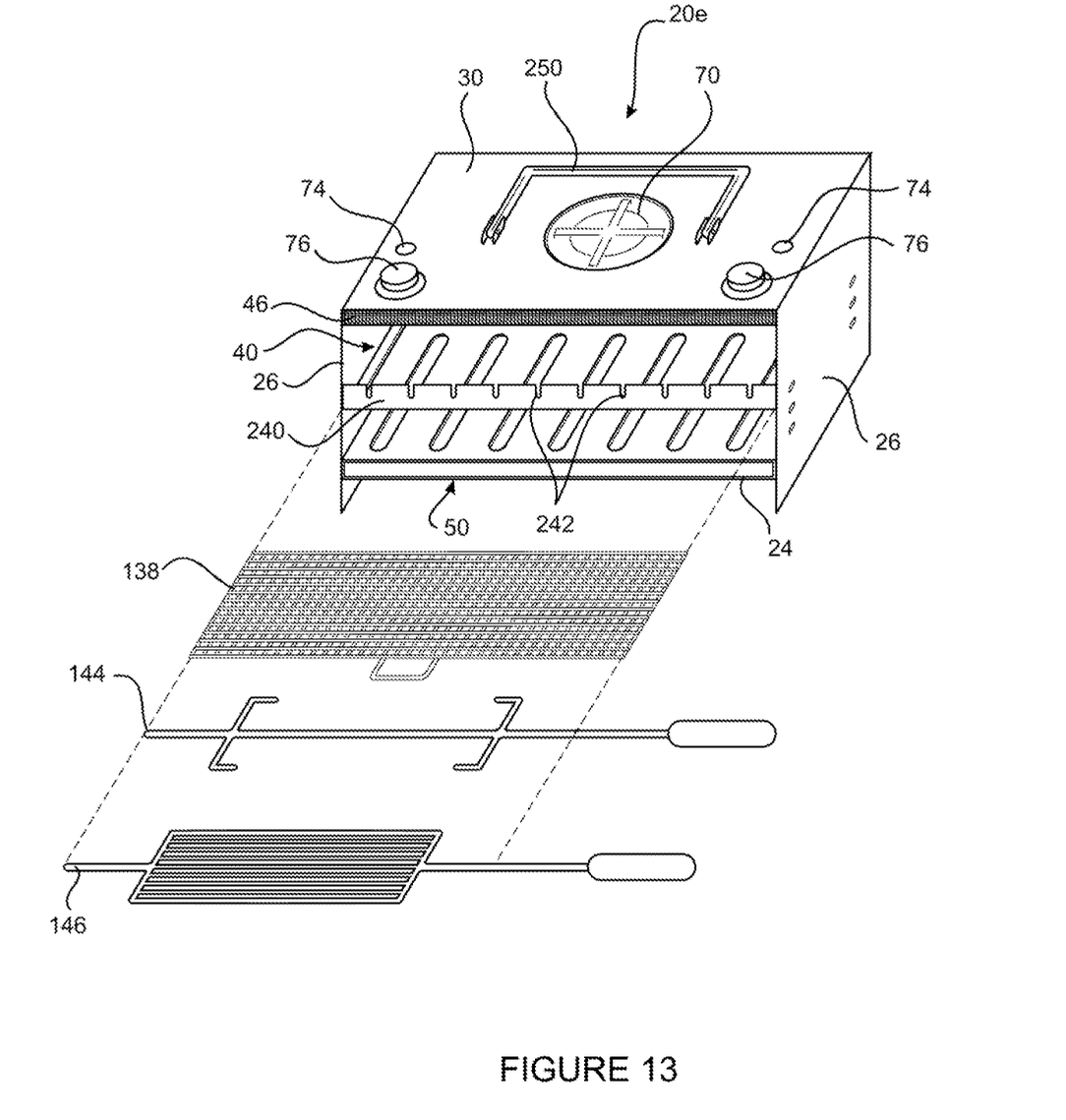
FIG. 13 is a front perspective view of a cooking apparatus in accordance with a fifth preferred embodiment of the present invention.

FIG. 13 shows a cooking apparatus 20e in accordance with a fifth preferred embodiment of the present invention. The cooking apparatus 20e also comprises a generally rectangular prism shaped body 22 having a base wall 24, side walls 26, a shorter rear wall and a top wall 30.

The heating means 46 in this embodiment extends along an internal (lower) surface of the top wall 30, downwardly directed to face the cooking space 40. The moisture infusion assembly 50 is arranged at a lower portion of the body 22 and defines the cooking space 40 with the side walls 26 and top wall 30. The rear wall only extends to the level of the moisture infusion assembly 50, and the cooking space 40 thus comprises an open rear section. The distance between the heating means 46 and the moisture infusion assembly 50 is about 25 cm in the embodiment. The heating means 46 is preferably a ceramic burner, but can alternatively be an electric element, or a combination of such heating means.

The portable fuel canister is housed at the lower rear section of the body 22. A gas burner (stove) 70 is also disposed in the top wall 30. Associated ignition buttons 74 and gas control knobs 76 for the heating means 46 and the gas burner 70 are disposed at the top wall 30. A fold back carry handle 250 is also provided at the top wall 30.

The cooking apparatus 20e comprises front and rear horizontal cooking racks 240 arranged across the open front and rear sections of the cooking space 40. The front and rear cooking racks 240 comprise aligned horizontally spaced slots 242 for receiving and supporting respective ends of skewers.

The cooking racks 240 can be attached to each other, or be separated and independently attachable to the body 22. The vertical position of the cooking racks 240 is adjustable between at least three possible positions, being a vertical midpoint of the cooking space 40, and 2.5 cm above and below the midpoint. The side walls 26 are provided with suitable means to allow the adjustment, such as vertically spaced slots for supporting the cooking racks 240.

In use, food is disposed in skewers and respective end portions of the skewers 110 are placed in the slots 242. Skewers with food are thus parallel spaced within the cooking space 40. An alternative to using the skewers is a grill holder 138, a spit rotisserie 144 or a mesh rotisserie 146, which can be used with or without the racks 240.

In other possible embodiments, the downwardly directed (top wall) and the laterally directed (rear wall) heating means can be combined in a single cooking apparatus. Additionally, heating means can also be provided for at least parts of the side walls.

A heating means, such as a heating element, can also be provided in the moisture infusion tray for heating the liquids therein.

I claim:

1. A portable cooking apparatus, comprising:
a cooking body comprised of a base wall, side walls, each side wall having a front edge and a back edge, a top wall, a lower front wall extending upward from said base wall at respective front edges of said side walls, an upper front wall extending downward from said top wall at respective front edges of said side walls, a lower shelf extending from said lower front wall to respective back edges of said side walls, a top panel extending from said upper front wall to said respective back edges of said side walls,
wherein said lower shelf, said top panel, and sections of said side walls between said lower shelf and said top panel, define a cooking space having an open front;
a portable fuel source;
a first heating means extended vertically from said lower shelf at respective back edges of said side walls toward said top panel within said cooking space and directing and distributing heat from said first heating means towards the cooking space;
a food holder made integral with said sections of said side walls corresponding to said cooking space, said food holder being comprised of portions of said side walls with vertically spaced slots and a plurality of skewers inserted into said vertically spaced slots and extending between said side walls; and
a moisture infusion assembly being comprised of a tray and a gate across a top portion of said tray and connected to said first heating means at said tray, said gate comprises an upper panel and a lower panel, each of said upper panel and said lower panel being comprised of elongated openings and bars therebetween respective elongated openings, each elongated opening having a closed position and an opened position and a partially opened position therebetween, each elongated opening in the lower panel being movable between said closed position and said opened position, said tray extending across and covering a lower portion of said cooking space, said moisture infusion assembly further being comprised of a liquid placed in the tray, said first heating means directing and distributing heat towards said tray in said cooking space, said liquid evaporating through said elongated openings in said gate so as to supply moisture to said cooking space.

2. The cooking apparatus of claim 1, wherein said first heating means extends upright from said lower shelf.

3. The cooking apparatus of claim 2,
wherein said cooking body is further comprised of a rear wall, said lower shelf extending from said lower front wall to said rear wall, said top panel extending from said upper front wall to said rear wall,
wherein said lower shelf, said top panel, said sections of said side walls between said lower shelf and said top panel, and a section of said rear wall between said lower shelf, said top panel, and said portions of said side walls, define said cooking space, and
wherein said first heating means is extended along said section of said rear wall between said lower shelf, said top panel, and said portions of said side walls corresponding to said cooking space.

4. The cooking apparatus of claim 3, wherein said rear wall is comprised of a loading door so as to form a fuel chamber, said fuel chamber connecting to said first heating means so as to provide fuel to said first heating means.

5. The cooking apparatus of claim 1, further comprising: a a second means for heating in said top wall.

6. The cooking apparatus of claim 1, wherein said first heating means comprises at least one of a group consisting of: a gas ceramic burner, a gas burner and an electric heating element.

7. The cooking apparatus of claim 1, wherein said moisture infusion assembly is disposed along and covers said lower shelf.

8. The cooking apparatus of claim 1, wherein said upper panel is fixed in position relative to said tray, and wherein said lower panel is slidable in a lateral direction relative to said upper panel.

9. The cooking apparatus of claim 1, further comprising: a vertical skewer mounted in said food holder.

10. The cooking apparatus of claim 9, further comprising: a turning means for attached to said vertical skewer.

11. The cooking apparatus of claim 1, further comprising: a grill holder having a mounting post and being mounted in said food holder.

12. The cooking apparatus of claim 1, wherein said first heating means is comprised of a briquette holder,
wherein said briquette holder, said lower shelf, said top panel, and said sections of said side walls between said lower shelf and said top panel, define said cooking space.

13. The cooking apparatus of claim 12, wherein said briquette holder comprises:
a briquette tray comprised of a base panel, side tray walls, an upper end wall, and a lower end wall,
wherein said base panel, said side tray walls, said upper end wall, and said lower end wall, define an upper opening and a trough portion adjacent said lower end wall, said trough portion being adjacent to said tray; and
a mesh extending across and covering said upper opening.

14. The cooking apparatus of claim 13, wherein said briquette tray is comprised of spaced shelves.

15. The cooking apparatus of claim 14, wherein said briquette holder has a horizontal loading position and an upright position set within said cooking space between said lower shelf and said top panel.

16. The cooking apparatus of claim 15, wherein said spaced shelves are comprised of a panel angled downwardly-towards said mesh when said briquette holder is said upright position.

17. The cooking apparatus of claim 16, wherein each spaced shelf is comprised of a distal portion disposed adjacent said mesh, when said briquette holder is in said upright position.

18. The cooking apparatus of claim 15, wherein each side wall is comprised of a mounting slot formation, wherein said briquette holder engages respective mounting slot formations so as to transition between said horizontal loading position and said upright position.

* * * * *